United States Patent
Tsai et al.

(10) Patent No.: US 7,107,373 B2
(45) Date of Patent: Sep. 12, 2006

(54) METHOD OF HOT SWITCHING DATA TRANSFER RATE ON BUS

(75) Inventors: Chau-Chad Tsai, Taipei (TW);
Chi-Che Tsai, Kaohsiung Hsien (TW);
Chih-Kuo Kao, Taipei (TW)

(73) Assignee: Via Technologies, Inc., Taipei Hsien (TW)

( * ) Notice: Subject to any disclaimer, the term of this patent is extended or adjusted under 35 U.S.C. 154(b) by 330 days.

(21) Appl. No.: 10/065,524

(22) Filed: Oct. 25, 2002

(65) Prior Publication Data

US 2003/0115398 A1    Jun. 19, 2003

(30) Foreign Application Priority Data

Dec. 14, 2001    (TW) ................ 90131022 A

(51) Int. Cl.
*G06F 13/42*    (2006.01)
*G06F 5/06*    (2006.01)

(52) U.S. Cl. .................. 710/105; 710/60; 710/306

(58) Field of Classification Search .............. 710/8, 710/29, 33, 58, 60, 104, 106, 305–306, 313–315; 370/545; 709/228, 233
See application file for complete search history.

(56) References Cited

U.S. PATENT DOCUMENTS

| | | | | |
|---|---|---|---|---|
| 5,491,814 A | * | 2/1996 | Yee et al. .................... | 713/501 |
| 5,625,807 A | * | 4/1997 | Lee et al. .................... | 713/601 |
| 5,628,001 A | * | 5/1997 | Cepuran ...................... | 713/501 |
| 5,628,019 A | * | 5/1997 | O'Brien ....................... | 713/322 |
| 5,630,145 A | * | 5/1997 | Chen ........................... | 713/322 |
| 5,678,065 A | * | 10/1997 | Lee et al. ..................... | 710/60 |
| 5,758,133 A | * | 5/1998 | Evoy ........................... | 713/501 |
| 5,935,232 A | * | 8/1999 | Lambrecht et al. ......... | 710/315 |
| 6,057,729 A | * | 5/2000 | Nomura ...................... | 327/592 |
| 6,067,590 A | * | 5/2000 | Pettey et al. ................. | 710/100 |
| 6,079,022 A | * | 6/2000 | Young ......................... | 713/300 |
| 6,148,357 A | * | 11/2000 | Gulick et al. ................ | 710/309 |
| 6,163,826 A | * | 12/2000 | Khan et al. .................. | 710/107 |
| 6,504,854 B1 | * | 1/2003 | Hofmann et al. ........... | 370/518 |
| 6,507,879 B1 | * | 1/2003 | Sayles ......................... | 710/104 |
| 6,539,443 B1 | * | 3/2003 | Dunstan et al. ............. | 710/106 |
| 6,732,190 B1 | * | 5/2004 | Williams et al. ............ | 709/250 |
| 2002/0023190 A1 | * | 2/2002 | Peng ........................... | 710/308 |
| 2002/0171456 A1 | * | 11/2002 | Solomon ..................... | 327/113 |

OTHER PUBLICATIONS

"Motherboards p. 2". Gen-X-PC. Dec. 7, 2003. Retrieved from Internet Archive Aug. 2, 2005. <http://web.archive.org/web/20031207042207/http://www.gen-x-pc.com/mobo2.htm>.*

(Continued)

*Primary Examiner*—Khanh Dang
*Assistant Examiner*—Thomas J. Cleary

(57) ABSTRACT

The present invention provides a method of hot switching data transfer rate on the bus to hot switch the data transfer rate of the bus between the control chips without the process of RESET. When the bus between the control chips demands a large amount of data transfer, the bus is hot switched to a higher data transfer rate to fulfill the data transfer requirement. Contrarily, when the bus between the control chips demands less amount of data transfer, the bus is hot switched to a lower data transfer rate to save power consumption.

7 Claims, 7 Drawing Sheets

OTHER PUBLICATIONS

"VIA KT400". VIA Technologies, Inc. Oct. 23, 2004. Retrieved from Internet Archive Aug. 2, 2005. <http://web.archive.org/web/20041023074816/http://www.via.com.tw/en/products/chipsets/k7-series/kt400>.*

* cited by examiner

METHOD OF HOT SWITCHING DATA TRANSFER RATE ON BUS

CROSS REFERENCE TO RELATED APPLICATIONS

This application claims the priority benefit of Taiwan application serial no. 901 31022, filed on Dec. 14, 2001.

BACKGROUND OF INVENTION

1. Field of Invention

The present invention generally relates to data transfer on the bus, and more particularly, to a method of hot switching data transfer rate on the bus.

2. Description of Related Art

In the information explosion era, information processing and information exchange have become more and more important. Since it is so important, how to make the process and information transmission faster is a common objective of present technological development. In the distributed process computer system, between chips that bear different tasks, fast exchange of information is the major factor impacting system performance. Taking the control chips of a computer motherboard as an example, the bus between the north-bridge chip and the south-bridge chip demands a large amount of data transfer. Therefore, its data transfer rate has advanced rapidly. However, while the data transfer rate on the bus has advanced rapidly, power consumption has also increased accordingly. Current computer systems have contradictory needs in data transfer rate and power consumption required to satisfy a sufficient amount of the data transfer rate. Therefore, the data transfer rate on the bus between the control chipsets at present is fixed at a data transfer rate of sufficient amount when the system is up and stable. This data transfer rate has to take into consideration the maximum transfer demand, but when there is no demand for such a large data transfer rate between the control chipsets, power consumption is still high.

SUMMARY OF INVENTION

In the view of this, the present invention provides a method of hot switching data transfer rate on the bus, so as to hot switch to higher data transfer rate when the bus between the control chips demands a large amount of data transfer, and hot switch to the lower data transfer rate when the bus between the control chips demands less amount of data transfer, to save power consumption.

In order to achieve the objective mentioned above and other objectives, the present invention provides a bus wherein the data transfer rate can be hot switched. The bus is used for the command transfer and the data transfer between the first control chip and the second control chip, wherein the data transfer rate can be dynamically switched. During the data transfer rate switching process, the system does not have to reboot. When the first chip receives a transfer rate switching command, the switching method programs the transfer rate register of the first control chip and the second control chip, then determines whether there is no data transaction processed or if the data transaction process is finished. If yes to either, the first control chip subsequently issues a bus release connect command. At this moment, the first control chip and the second control chip enter into the bus release connect state according to the bus release connect command. When either the first control chip or the second control chip issue a bus re-connect command, the first control chip and the second control chip re-connect the bus at the changed data transfer rate according to the content of the data transfer rate register. The bus comprises the data bus, the command signal line and the trigger signal line. The data bus is used to transfer the address and data signal. The command signal line is used to transfer the command signal. The command signal at least comprises the bus release connect command, the bus re-connect command, the data reading command and the data writing command. The trigger signal line is used to synchronously latch the command signal, address and data signal.

To simplify the bus arbitration mechanism, the command signal line herein should comprise the unidirectional up command signal line and the unidirectional down command signal line, whereas the trigger signal line should comprise the unidirectional up trigger signal line and the unidirectional down trigger signal line. The bus is suitable for all sorts of control chips that need to exchange information via the bus, such as the north-bridge chip and the south-bridge chip of the computer motherboard. The data transfer rate is switched between, for example, four times the clock frequency of the north-bridge chip and eight times the clock frequency of the north-bridge chip.

From the description above, by using the method of hot switching the data transfer rate on the bus, the system is no longer limited by a bus data transfer rate that is fixed. The system is able to hot switch to a lower bus data transfer rate when the system does not demand such a large amount of bus data transfer, rate, in order to save power consumption. The system applying the present invention is able to hot switch to the higher bus data transfer rate when the system demands a large amount of data transfer, to fulfill the requirement of the data transfer, and then the system applying the present invention is able to hot switch to the lower bus data transfer rate when the system demands a less amount of data transfer, to save power consumption.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows the bus sketch map of the VLINK BUS of a preferred embodiment according to the present invention.

DETAILED DESCRIPTION

Figure 1:
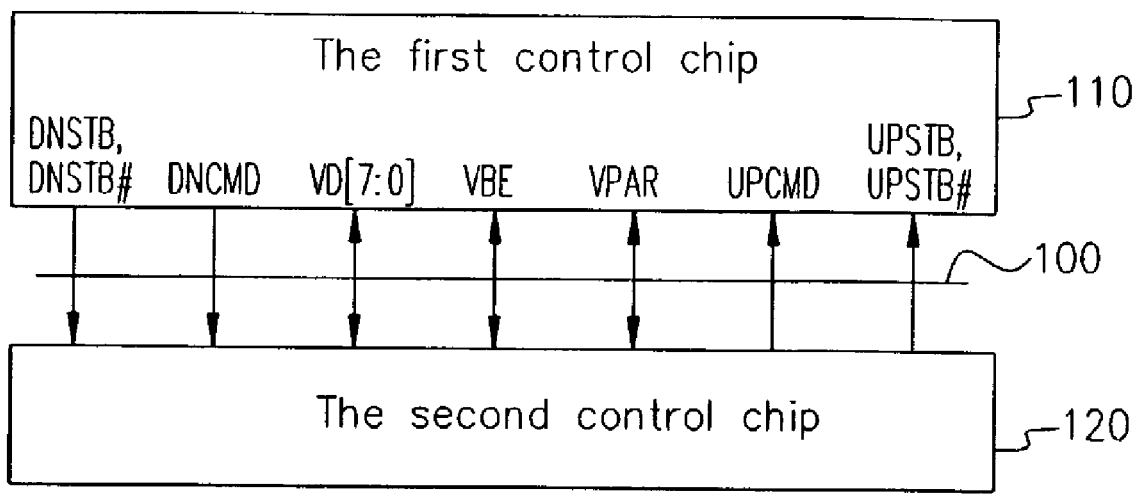

The VLINK BUS of a preferred embodiment according to the present invention is exemplified hereafter. FIG. 1 schematically shows the bus sketch map of the VLINK BUS of a preferred embodiment according to the present invention. The VLINK BUS is the bus designed and invented by VIA Technologies, Inc. and is used between control chipsets. As shown in the diagram, the VLINK BUS 100 of the present invention is connected to the first control chip 110 and the second control chip 120, and is used to provide data transfer between these two chips. Herein, the first chip is, for example, the north-bridge chip of the computer motherboard, and the second control chip is, for example, the south-bridge chip of the computer motherboard. As shown in the diagram, the VLINK BUS 100 comprises the data bus (VD[7:0]), the command signal line (UPCMD, DNCMD), the trigger signal line (UPSTB, UPSTB#, DNSTB and DNSTB#), the length/byte enable signal line (VBE), and the common bit check signal line (VPAR). The command signal line comprises the unidirectional up command signal line (UPCMD) and the unidirectional down command signal line (DNCMD). The trigger signal line comprises the unidirectional up trigger signal line (UPSTB, UPSTB#) and the unidirectional down trigger signal line (DNSTB, DNSTB#). The data bus (VD[7:0]) is used to transfer the address and data signal. The up command signal line (UPCMD) and the down command signal line (DNCMD) are used to transfer the command signal. The command signal at least comprises the bus release connect command, the bus re-connect command, the data reading command, and the data writing command. The up trigger signal line (UPSTB, UPSTB#) and the down trigger signal line (DNSTB, DNSTB#) are used to synchronously latch the command signal, address and data signal transferred by the data bus (VD[7:0]), the up command signal line (UPCMD) and the down command signal line (DNCMD).

Figure 2:
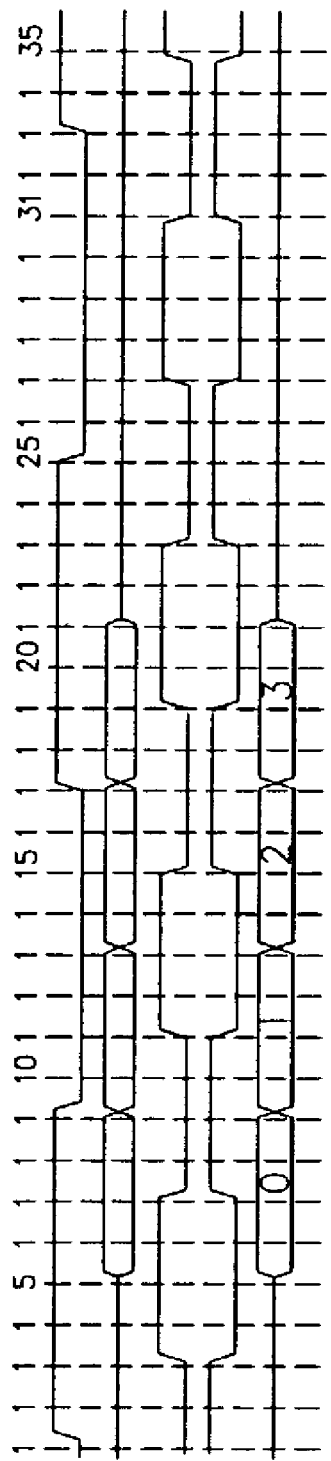
FIG. 2 schematically shows the clock sequence diagram when the VLINK BUS of a preferred embodiment according to the present invention is operated at four times the clock frequency.

FIG. 2 schematically shows the clock sequence diagram when the VLINK BUS of the present invention is operated at four times the clock frequency. As shown in the diagram, the clock frequency of the first control chip, such as the north-bridge chip of the computer motherboard, is 66 MHz. The clock frequency of the down trigger signal line (DNSTB, DNSTB#) is two times the clock frequency of the first control chip. The down trigger signal line (DNSTB, DNSTB#) is utilized to latch the command signal, address and data signal transferred by the data bus (VD[7:0]) and the down command signal line (DNCMD). It is known that the data transfer rate in the diagram is four times the clock frequency of the north-bridge chip. In the opposite circumstance, the data upload would use a method analogous to this to generate four times the data transfer rate.

Figure 3:
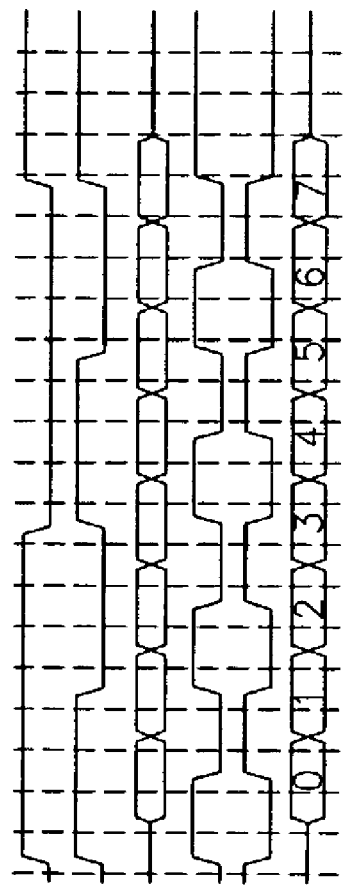
FIG. 3 schematically shows the clock sequence diagram when the VLINK BUS of a preferred embodiment according to the present invention is operated at eight times the clock frequency.

FIG. 3 schematically shows the clock sequence diagram when the VLINK BUS of the present invention is operated at eight times the clock frequency. As shown in the diagram, the clock frequency of the first control chip, such as the north-bridge chip of the computer motherboard, is 66 MHz. The clock frequency of the down trigger signal line (DN-STB, DNSTB#) is four times the clock frequency of the first control chip. The down trigger signal line (DNSTB, DNSTB#) is utilized to latch the command signal, address and data signal transferred by the data bus (VD[7:0]) and the down command signal line (DNCMD). It is known that the data transfer rate in the diagram is eight times the clock frequency of the north-bridge chip. In the opposite circumstance, the data upload would use a method analogous to this to generate eight times the data transfer rate.

Figure 4:
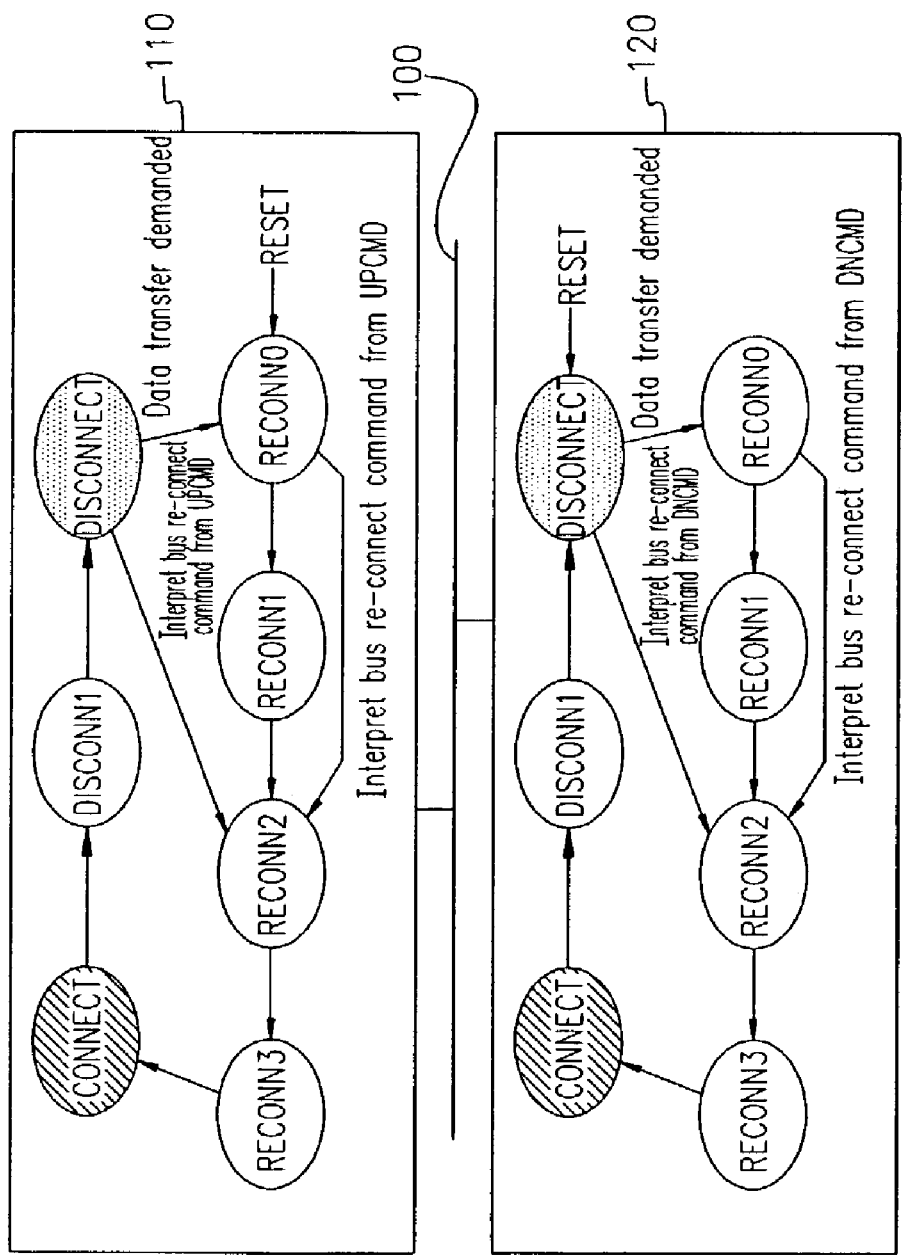
FIG. 4 schematically shows the state diagram of the first control chip and the second control chip of a preferred embodiment according to the present invention.

FIG. 4 schematically shows the state diagram of the first control chip and the second control chip of a preferred embodiment according to the present invention. As shown in the diagram, the first control chip 110, such as the north-bridge chip of the computer motherboard, and the second control chip 120, such as the south-bridge chip of the computer motherboard, transfer the command, address and data signal through the VLINK BUS 100. The first control chip 110 and the second control chip 120 both comprise the states of the RECONN0, RECONN1, RECONN2, RECONN3, CONNECT, DISCONN1 and DISCONNECT. The difference is that the first control chip 110 directly enters into the RECONN0 state when it is RESET, whereas, the second control chip 120 directly enters into the DISCONNECT state when it is RESET. In the system RESET, the first control chip 110 actively drives one clock period to the down command signal line (DNCMD), indicating the bus re-connect command, and enters into the CONNECT state via the RECONN1, RECONN2 and RECONN3 state. The second control chip 120 in the DISCONNECT state enters into the CONNECT state via the RECONN2 and RECONN3 state by interpreting the bus re-connect command of the down command signal line (DNCMD).

Figure 5:
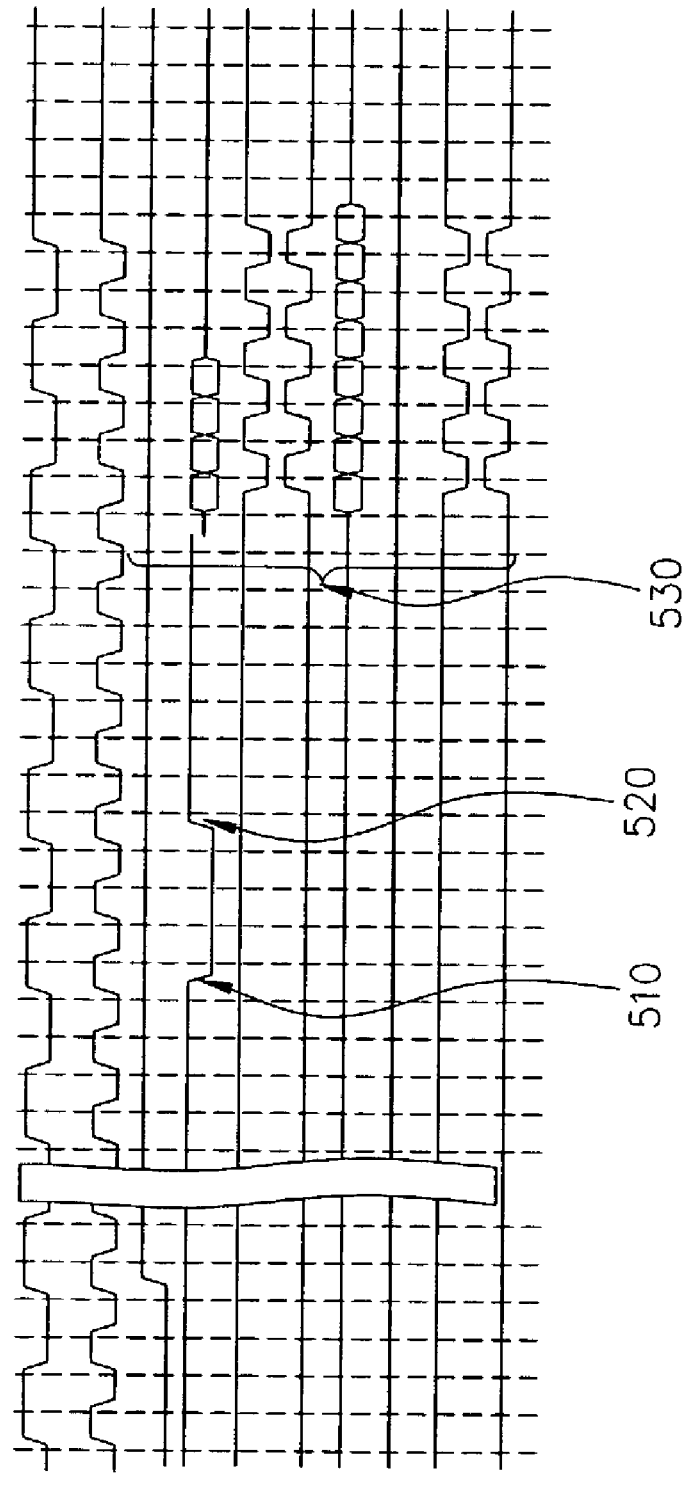
FIG. 5 schematically shows the clock sequence diagram when the VLINK BUS of a preferred embodiment according to the present invention enters into the connect state after the system is started.

FIG. 5 schematically shows the clock sequence diagram when the VLINK BUS of a preferred embodiment according to the present invention enters into the connect state after the system is started. Referring to the state diagram of FIG. 4, the first control chip 110 enters into the RECONN0 state when it is RESET. The second control chip 120 enters into the DISCONNECT state when it is RESET. Therefore, when the first control chip 110 enters into the RECONN1 state at 510 as shown in the diagram, the first control chip 110 actively drives a clock period to the down command signal line (DNCMD) for indicating the bus re-connect command. The second control chip 120 interprets the bus re-connect command of the down command signal line (DNCMD) at 520 as shown in the diagram. At this moment, the first control chip 110 and the second control chip 120 enter into the RECONN2 state simultaneously, and enter into the CONNECT state simultaneously after two clock periods at 530 as shown in the diagram. At this moment, the up trigger signal line (UPSTB, UPSTB#) and the down trigger signal line (DNSTB, DNSTB#) start to activate.

Figure 6:
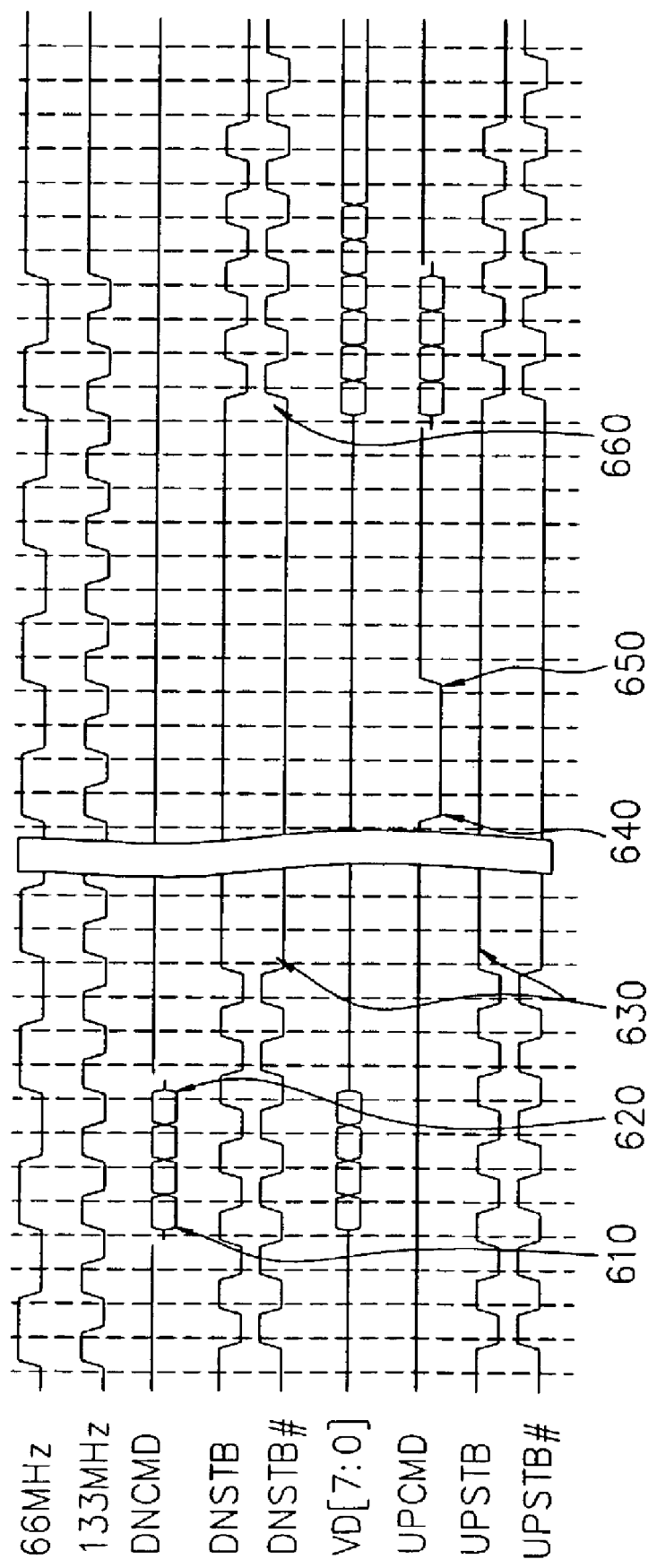
FIG. 6 schematically shows the clock sequence diagram when the VLINK BUS of a preferred embodiment according to the present invention enters into the release connect state and re-enters into the connect state.

FIG. 6 schematically shows the clock sequence diagram when the VLINK BUS of a preferred embodiment according to the present invention enters into the release connect state and re-enters into the connect state. Referring also to the state diagram of FIG. 4, in FIG. 6, the first control chip 110 issues the bus release connect command via the down command signal line (DNCMD) at 610 as shown in the diagram. The second control chip 120 interprets the bus release connect command of the down command signal line (DNCMD) at 620 as shown in the diagram, so as to enter into the DISCONN1 state accompanied with the first control chip 110 simultaneously. The first control chip 110 and the second control chip 120 enter into the DISCONNECT state simultaneously after one clock period at 630 as shown in the diagram. At this moment, the first control chip 110 and the second control chip 120 deactivate the up trigger signal line (UPSTB, UPSTB#) and the down trigger signal line (DNSTB, DNSTB#) to save the power consumption. In the diagram, when the first control chip 110 and the second control chip 120 are all in the DISCONNECT state, if the second control chip 120 is demanded to transfer data, it enters into the RECONN0 from the state of DISCONNECT. The second control chip 120 then enters into the RECONN1 state at 640 as shown in the diagram, and actively drives a clock period to the up command signal line (UPCMD), indicating the bus re-connect command. The first control chip 110 interprets the bus re-connect command of the up command signal line (UPCMD) at 650 as shown in the diagram. At this moment, the first control chip 110 and the second control chip 120 enter into the RECONN2 state simultaneously, and enter into the CONNECT state simultaneously after two clock periods at 660 as shown in the diagram. At this moment, the up trigger signal line (UPSTB, UPSTB#) and the down trigger signal line (DNSTB, DNSTB#) start to activate to provide the service of fulfilling the data transfer demand.

Figure 7:
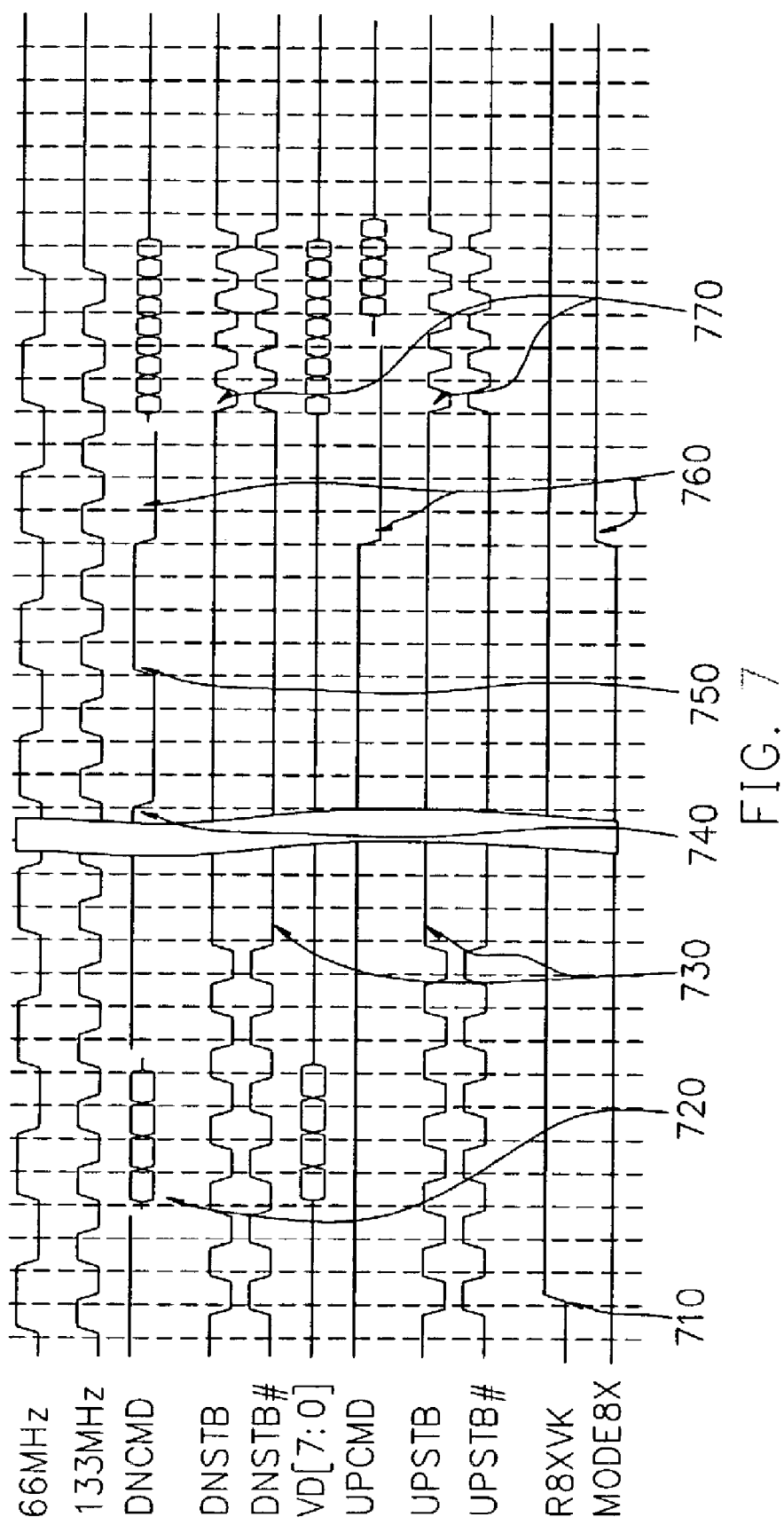
FIG. 7 schematically shows the clock sequence diagram when the VLINK BUS of a preferred embodiment according to the present invention enters into the release connect state and re-enters into the connect state at eight times the clock-frequency bus data transfer rate.
Figure 8:
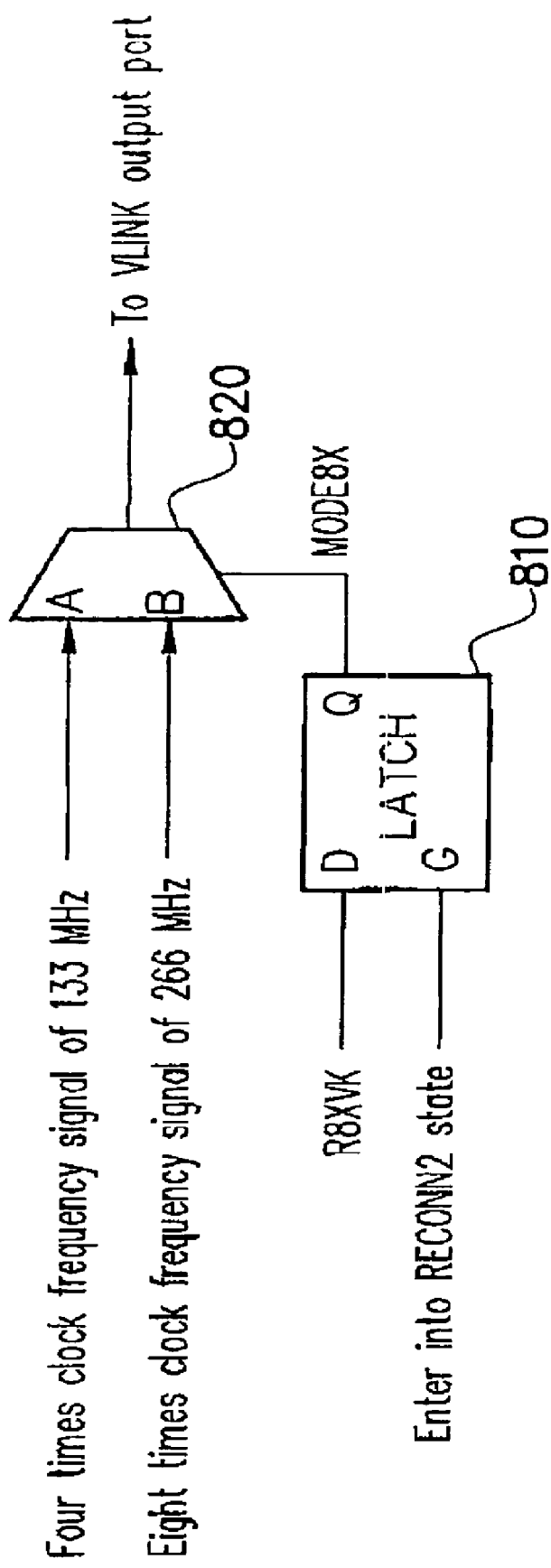
FIG. 8 schematically shows the sketch map of the switching control circuit of the VLINK BUS signal line of a preferred embodiment according to the present invention.

FIG. 7 schematically shows the clock sequence diagram when the VLINK BUS of a preferred embodiment according to the present invention enters into the release connect state and re-enters into the connect state at eight times clock frequency bus data transfer rate. In the diagram, an internal register R8XVK (this is the transfer rate register) and an internal signal MODE8X are provided to the first control chip 110 and the second control chip 120 of the present invention to determine the data transfer rate when the VLINK BUS is re-connected. In the present example, the data transfer rate is four times the bus clock frequency when the R8XVK is in low level, and the data transfer rate is eight times the bus clock frequency when the R8XVK is in high level. The diagram describes how the bus data transfer rate "hot switches" from four times clock frequency to eight times clock frequency without the RESET to change its data transfer rate. At 710 as shown in the diagram, when the system acknowledges the current bus data transfer rate is obviously insufficient or the higher data transfer rate is demanded, a transfer rate switching command is issued through the application or the device driver to program both of the registers R8XVK in the first control chip 110 and in the second control chip 120 to high level. The first control chip 110 subsequently issues the bus release connect command at 720 as shown in the diagram. Moreover, the first control chip 110 and the second control chip 120 enter into the DISCONNECT state simultaneously at 730 as shown in the diagram. If the first control chip 110 is demanded for bus data transfer, the first control chip 110 drives a clock period to the down command signal line (DNCMD) to indicate the bus reconnect command at 740 as shown in the diagram. The second control chip 120 interprets the bus re-connect command of the down command signal line (DNCMD) at 750 as shown in the diagram. At this moment, the first control chip 110 and the second control chip 120 enter into the RECONN2 state simultaneously. The data latch 810 (FIG. 8) latches the output of the R8XVK to the output port MODE8X at 760 as shown in the diagram. The internal control signal MODE8X is used as the selection input of the multiplexer 820 to selectively output the drive output signal at eight times clock frequency to the bus signal line. At this moment, the up command signal line (UPCMD) and the down command signal line (DNCMD) are also changed from the active low to the active high. Furthermore, after one clock period again at 770 as shown in the diagram, the first control chip 110 and the second control chip 120 enter into the CONNECT state simultaneously. At this moment, the up trigger signal line (UPSTB, UPSTB#) and the down trigger signal line (DNSTB, DNSTB#) start to activate the four times clock frequency. That is, the bus data transfer rate is "hot switched" to the eight times clock frequency at this time.

It is known to those skilled in the art that when the system considers that the higher data transfer rate is not demanded, the register R8XVK can be programmed to low level via the application or the device driver to "hot switch" the bus data transfer rate from eight times clock frequency to four times clock frequency without the RESET to change its data transfer rate, so it is only the converse process that is described above.

The descriptions mentioned above provide a method of hot switching data transfer rate on the bus to dynamically switch the data transfer rate in between the first control chip and the second control chip, and in the data transfer rate switching process, the RESET is not needed. The method comprises the steps of: at first, the first control chip and the second control chip receive a transfer rate switching command; then, when there is no data transaction processed or the data transaction processed is finished, the first control chip issues a bus release connect command; afterwards, the first control chip and the second control chip enter into the bus release connect state according to the bus release connect command; when the data transfer is demanded, the first control chip and the second control chip issue a bus re-connect command; at this moment, the first control chip and the second control chip re-connect to the changed bus data transfer rate according to the transfer rate switching command.

Therefore, it is known that by using the method of the hot switching data transfer rate on the bus, the system is no longer limited by a bus data transfer rate that is fixed to a certain amount. The system is able to hot switch to the lower bus data transfer rate when the system does not demand such a large amount of the bus data transfer rate to save the power consumption. That is, the system applying the present invention is able to hot switch to the higher bus data transfer rate when the system demands a large amount of data transfer to fulfill the requirement of the data transfer. Contrarily, the system applying the present invention is able to hot switch to the lower bus data transfer rate when the system demands a less amount of data transfer to save the power consumption.

Although the invention has been described with reference to a particular embodiment thereof, it will be apparent to one of ordinary skill in the art that modifications to the described embodiment may be made without departing from the spirit of the invention. Accordingly, the scope of the invention will be defined by the attached claims not by the above detailed description.

The invention claimed is:

1. A method of hot switching a data transfer rate on a bus, to dynamically switch the data transfer rate on the bus between a first control chip and a second control chip, comprising the steps of:
   the first control chip and the second control chip receiving a transfer rate switching command;
   when either there is no data transaction processed or the data transaction process is finished, the first control chip issuing a bus release connect command;
   the first control chip and the second control chip entering into the bus release connect state according to the bus release connect command;

either the first control chip or the second control chip issuing a bus re-connect command; and the first control chip and the second control chip re-connecting to the rate-changed bus according to the transfer rate switching command.

2. The method of hot switching data transfer rate on the bus of claim 1, wherein the first control chip is a north-bridge chip, and the second control chip is a south-bridge chip.

3. The method of hot switching data transfer rate on the bus of claim 2, wherein the data transfer rate is switched between four times the north-bridge chip clock frequency and eight times the north-bridge chip clock frequency.

4. The method of hot switching data transfer rate on the bus of claim 1, wherein the first control chip and the second control chip both have a transfer rate register for temporarily storing the transfer rate switching command.

5. A method of hot switching a data transfer rate on a bus, to dynamically switch a plurality of data transfer rates on the bus between a first control chip and a second control chip, comprising the steps of:

the first control chip and the second control chip receiving a data transfer rate switching command, and temporarily storing the data transfer rate switching command into transfer rate registers of the first control chip and the second control chip;

when either there is no data transaction processed or the data transaction process is finished, issuing a bus release connect command to have the first control chip and the second control chip enter into a bus release connect state; and when either the first control chip or the second control chip issues a bus re-connect command, the first control chip and the second control chip switching to one of the data transfer rates on the bus according to contents of the transfer rate registers.

6. The method of hot switching data transfer rate on the bus of claim 5, wherein the first control chip is a north-bridge chip, and the second control chip is a south-bridge chip.

7. The method of hot switching data transfer rate on the bus of claim 6, wherein the data transfer rates at least comprise four times the north-bridge chip clock frequency and eight times the north-bridge chip clock frequency.

* * * * *